United States Patent
Mikawa

(10) Patent No.: US 7,505,674 B2
(45) Date of Patent: Mar. 17, 2009

(54) IMAGE PROCESSING APPARATUS AND METHOD FOR GENERATING AND DISPLAYING PLAYLIST FOR IMAGE DATA

(75) Inventor: Takuma Mikawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 840 days.

(21) Appl. No.: 10/716,404

(22) Filed: Nov. 20, 2003

(65) Prior Publication Data

US 2004/0170386 A1 Sep. 2, 2004

(30) Foreign Application Priority Data

Dec. 4, 2002 (JP) ............................. 2002-352442

(51) Int. Cl.
*H04N 5/91* (2006.01)
(52) U.S. Cl. ................. 386/95; 386/45; 386/125; 386/126; 386/52; 386/111
(58) Field of Classification Search ............. 386/45, 386/95, 125–126, 52, 65, 124
See application file for complete search history.

(56) References Cited

U.S. PATENT DOCUMENTS

| | | | |
|---|---|---|---|
| 6,374,037 B1 | 4/2002 | Okada et al. ............... 386/95 |
| 7,209,643 B2 * | 4/2007 | Sato et al. ................. 386/95 |
| 7,325,043 B1 * | 1/2008 | Rosenberg et al. ........... 709/219 |
| 2002/0098813 A1 * | 7/2002 | Likourezos et al. ........... 455/93 |
| 2003/0001880 A1 * | 1/2003 | Holtz et al. ................ 345/716 |
| 2003/0147633 A1 | 8/2003 | Mikawa ..................... 386/111 |
| 2004/0057700 A1 * | 3/2004 | Okada et al. ................ 386/95 |
| 2006/0259375 A1 * | 11/2006 | Deguchi .................... 705/27 |
| 2006/0265421 A1 * | 11/2006 | Ranasinghe et al. ......... 707/104.1 |
| 2008/0065780 A1 * | 3/2008 | Iwata et al. ................ 709/231 |

FOREIGN PATENT DOCUMENTS

| | | |
|---|---|---|
| CN | 1344412 | 4/2002 |
| JP | 2001-203973 | 7/2001 |

* cited by examiner

*Primary Examiner*—Thai Tran
*Assistant Examiner*—Helen Shibru
(74) *Attorney, Agent, or Firm*—Fitzpatrick, Cella, Harper & Scinto

(57) ABSTRACT

An image processing apparatus generates playlist data based on a specified playback procedure, and generates date information of the playlist data based on date information regarding image data specified in the playlist data. The playlist data and the date information of the playlist data are recorded in association with each other on a recording medium.

14 Claims, 11 Drawing Sheets

FIG. 3

| CONTENT LIST | |
|---|---|
| FILENAME | DATE |
| Movie0.mpg | 1999-12-15 |
| PlayList1.pl | 1999-12-15 |
| Movie1.mpg | 2000-01-01 |
| Movie2.mpg | 2000-01-03 |
| Movie3.mpg | 2000-01-05 |
| Movie4.mpg | 2000-06-07 |
| Movie5.mpg | 2001-08-01 |

FIG. 5

| CONTENT LIST | | |
|---|---|---|
| THUMBNAIL | FILENAME | DATE |
| Movie0 | Movie0.mpg | 1999-12-15 |
| PlayList1 | PlayList1.pl | 1999-12-15 |
| Movie1 | Movie1.mpg | 2000-01-01 |
| Movie2 | Movie2.mpg | 2000-01-03 |
| Movie3 | Movie3.mpg | 2000-01-05 |
| Movie4 | Movie4.mpg | 2000-06-07 |
| Movie5 | Movie5.mpg | 2001-08-01 |

FIG. 8

| THUMBNAIL | FILENAME | DATE |
|---|---|---|
| CONTENT LIST | | |
| Movie0 | Movie0.mpg | 1999-12-15 |
| Movie1 | Movie1.mpg | 2000-01-01 |
| Movie2 | Movie2.mpg | 2000-01-03 |
| Movie3 | Movie3.mpg | 2000-01-05 |
| Movie4 | Movie4.mpg | 2000-06-07 |
| Movie5 | Movie5.mpg | 2001-08-01 |
| | | |
| | | |

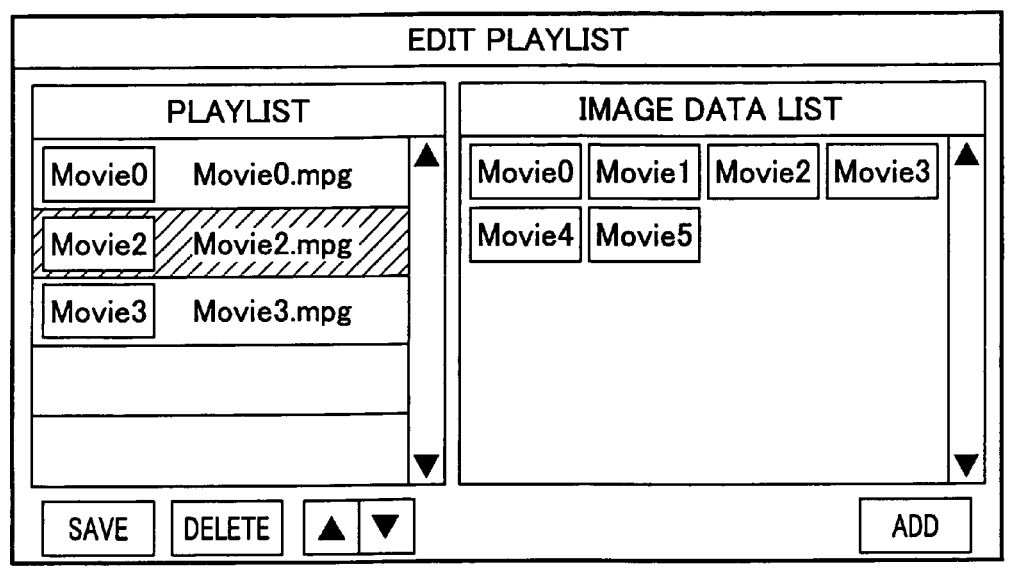

IMAGE PROCESSING APPARATUS AND METHOD FOR GENERATING AND DISPLAYING PLAYLIST FOR IMAGE DATA

BACKGROUND OF THE INVENTION

1. Field of the Invention

The present invention relates to an image processing apparatus that is capable of processing a playlist indicating a procedure for playing back image data.

2. Description of the Related Art

Recently, apparatuses for recording or playing back moving pictures or still pictures in the form of digital data, such as digital cameras and digital video cameras, have been commonly used.

In digital cameras, small-sized memory cards are commonly used as recording media, and such memory cards that allow recording of moving-picture data as well as still-picture data are available. In digital video cameras, recording media that allow random access, such as small-sized memory cards and magneto-optical disks, have become available as well as tapes. This has enabled recording of moving-picture data as well as still-picture data.

In a digital video camera that uses such a recording medium that allows random access, image data is saved in the form of a file. Usually, date information of the time when the image is captured is recorded together with the image data. "Date information" herein refers to information indicating a date only, or information indicating a date and a time of day.

As described above, in apparatuses in which image data is saved in the form of a file, usually, a list of files is displayed in order to allow recognition of content recorded on a recording medium. In that case, the files are usually sorted in order of dates when the image data is captured.

FIG. 8 shows an example of such a display of a list of files. Referring to FIG. 8, six image data files Movie0 to Movie5 are shown in the form of a list.

In the example shown in FIG. 8, three pieces of information, namely, thumbnail image of image data, filename of image data, and capture-date information of image data, are displayed as information regarding the image data files. Since the image data files are displayed as sorted in order of capture dates, the image files are presented to the user as sorted in order of capture dates. Thus, it becomes easier to grasp content, serving to improve ease of searching.

Recently, digital cameras and digital video cameras also have become available that record position (location) information, e.g., the places where the image data is captured in addition to the image data, for example, using GPS (Global Positioning System) location data.

In a known method permitting recognition of content recorded on a recording medium having recorded thereon image data with position information, a map is displayed and position information of image data is displayed over the map.

FIG. 9 shows an example of a display using a map. In FIG. 9, six image data files Movie0 to Movie5 are displayed.

Furthermore, in the example shown in FIG. 9, as information regarding the image data files, three pieces of information, namely, thumbnail images of the image data, filenames of the image data, and position information of the image data, are displayed. Furthermore, points corresponding to the position information of the image data are displayed on the map.

By using a display including a map, it becomes easier to recognize a place where the user captured the image data, serving to improve ease of searching.

Furthermore, recently, apparatuses capable of processing a playlist indicating a playback procedure of image data, such as playback position, playback time, or playback order, have been developed. By using a playlist, the user is allowed to playback image data in a procedure specified by the user, without directly processing image data recorded on a recording medium.

A process of generating a playlist is a kind of editing of moving-picture data, and the playlist allows registered image data to be played back in an order specified in the playlist. Such a technique is disclosed, for example, in Japanese Patent Laid-Open No. 2001-203973.

However, in an apparatus capable of generating a playlist, a playlist is saved with information indicating a date when the playlist is generated. Thus, when the playlist is displayed in an order based on date, the order is irrelevant to capture dates of image data registered in the playlist.

This problem also arises when a mixed list, including image data and playlist(s), is displayed, as well as when only a playlist is displayed.

FIG. 11 shows an example of a display in which a mixed list of playlist and image data sorted in order of date is displayed. In this example, a file named PlayList1.pl is a playlist file generated on Nov. 1, 2001. According to the playlist, files named Movie0, Movie2, and Movie3 will be played back in that order.

As shown in FIG. 11, date information of the playlist indicates a generation date of the playlist, which date is irrelevant to date information of the image data actually specified in the playlist. In this example, date information (playlist generation date Nov. 1, 2001) that is irrelevant to the date information of image data Movie0, Movie2, and Movie3 registered in the playlist (e.g., respective capture dates), is recorded as date information of the playlist. Thus, when a list of content is displayed, the content is not ordered as desired by the user, possibly raising difficulty in grasping the content.

The same problem may arise regarding position information.

That is, if the position information of a place where the playlist was generated is saved, when a playlist is displayed on a map as described earlier, the playlist is displayed at a position irrelevant to the specific image data registered in the playlist, raising difficulty in grasping the content.

FIG. 12 shows an example of a display in which both playlist and image data are displayed using a map. In this example, a file named PlayList1.pl is a playlist file generated by the user at a place 7. According to the playlist, files Movie0, Movie2, and Movie3 are registered so that these files will be played back in that order.

As shown in FIG. 12, the position information of the playlist indicates a position where the playlist was generated, which position (location) is irrelevant to position information of the specific image data that is to be actually played back. In this example, position information (e.g., location "7") that is irrelevant to the position information of the image data Movie0, Movie2, and Movie3 registered in the playlist (e.g., the position at capture), is recorded as position information of the playlist. Thus, when a list of content is displayed on the map, the content is displayed at an unintended position on the map, raising difficulty in grasping the content.

SUMMARY OF THE INVENTION

It is an object of the present invention to overcome the problems described above.

It is another object of the present invention to allow more accurate recognition of the status of a playlist.

It is yet another object of the present invention to improve ease of searching in a playlist.

These objects and advantages may be achieved by the present invention. In one aspect, the present invention provides an apparatus for processing image data and playlist data indicating a playback procedure of the image data. The apparatus includes a playlist processing unit for generating playlist data based on a specified playback procedure, and generating date information of the playlist data based on date information regarding image data specified in the playlist data, and a recording unit for recording the playlist data and the date information of the playlist data in association with each other on a recording medium.

In another aspect, the present invention provides a signal processing method for processing image data and playlist data indicating a playback procedure of the image data. The method includes the steps of generating playlist data based on a specified playback procedure, and generating date information of the playlist data based on date information regarding image data specified in the playlist data, and recording the playlist data and the date information of the playlist data in association with each other on a recording medium.

Further objects, features and advantages of the present invention will become apparent from the following description of the preferred embodiments with reference to the attached drawings.

BRIEF DESCRIPTION OF THE DRAWINGS

FIG. 3 shows a content-list display screen according to the first embodiment.

FIG. 5 shows a content-list display screen according to the second embodiment.

FIG. 8 is a conventional content-list display screen that is based on date information.

FIG. 10 shows an example of a playlist editing screen.

FIG. 11 shows a conventional content-list display screen showing a result of editing a playlist.

DESCRIPTION OF THE PREFERRED EMBODIMENTS

Now, preferred embodiments of the present invention will be described with reference to the drawings.

First Embodiment

Figure 1:
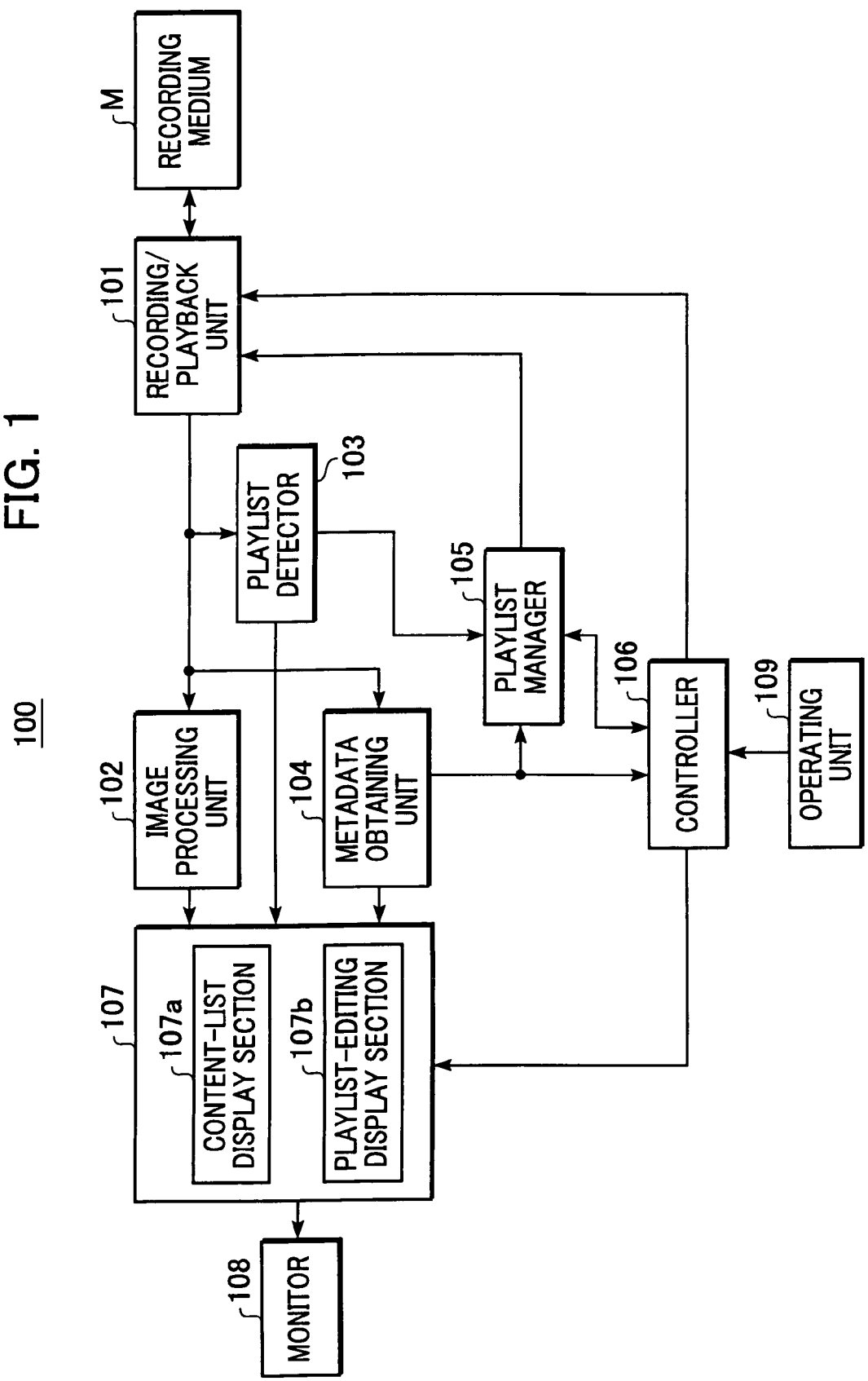
FIG. 1 is a functional block diagram showing the configuration of an image processing apparatus according to an embodiment of the present invention.

FIG. 1 is a functional block diagram showing the configuration of an image processing apparatus 100 according to a first embodiment.

Referring to FIG. 1, a recording medium M allows image data and a playlist to be recorded thereon and reproduced therefrom. As the recording medium M, a random-access medium, for example, a disk medium, such as an optical disk, or a memory card, may be used. A recording/playback unit 101 allows various data to be recorded on or played back from the recording medium M. An image processing unit 102 decodes moving-picture data or still-picture data played back by the recording/playback unit 101. A playlist detector 103 detects playlist data played back by the recording/playback unit 101 and outputs the playlist data to a playlist manager 105. The playlist detector 103 also outputs a filename, thumbnail, and date information in the playlist data to a display controller 107. A metadata obtaining unit 104 obtains metadata, such as date information and thumbnail image data from each image file played back by the recording/playback unit 101, and outputs the metadata to the display controller 107, the playlist manager 105, and a controller 106. As described earlier, a playlist refers to data that indicates a playback procedure of still-picture data or moving-picture data recorded on the recording medium M, and the playlist is recorded in the form of a single file. The playback procedure may be playback position, playback time, playback order, and the like.

The display controller 107 generates data of screens that are displayed on a monitor 108. The display controller 107 includes a content-list display section 107a for generating a screen display showing a list of content recorded on the recording medium M, and a playlist-editing display section 107b for generating a screen display for allowing editing of a playlist (e.g., by user prompts and/or function keys). The display controller 107 also generates screen displays based on images supplied from the image processing unit 102 during normal playback or playlist playback. The monitor 108 displays various screens. The playlist manager 105 is responsible for generating, modifying, or otherwise managing a playlist according to instructions from the controller 106 in accordance with operations by a user. The controller 106 controls operations of the components of the image processing apparatus 100. An operating unit 109 allows input of operations by a user.

The functions of the playlist manager 105 and the controller 106 preferably are implemented by a microcomputer including a CPU, a ROM, and a RAM. However, alternative hardware and/or software structures may be used, as are well known to those skilled in the art.

Next, operations of the image processing apparatus 100 configured as described above will be described.

In this embodiment, date information is additionally recorded together with a playlist file. Furthermore, in this embodiment, the function of editing a playlist and the function of listing content (image files) recorded on the recording medium M are provided, and a playlist editing mode for editing a playlist and a content-list display mode for displaying a list of content are switched between according to operations by a user.

In this embodiment, when a playlist is saved, date information is added to the playlist based on date information of image data that is to be played back first among the specific image data registered in the playlist.

First, an operation in the playlist editing mode will be described.

FIG. 10 shows a playlist generating screen that is displayed on the monitor 108 when the image processing apparatus 100 is in the playlist editing mode. The screen shown in FIG. 10 allows operations of buttons and the like thereon using a touch panel.

In an area designated "IMAGE DATA LIST" on the right side of the screen display, a list of thumbnail images of the image data recorded on the recording medium M is displayed. Referring to FIG. 11, a list of six pieces of image data, Movie0 to Movie5, is displayed.

In an area designated "PLAYLIST" on the left side of the screen display, a playlist that is being generated, including thumbnails and filenames of image data registered in the playlist, is displayed. The image data displayed in the area designated "PLAYLIST" will be played back in order from the top.

Referring to FIG. 10, Movie0 is registered as image data that is to be played back first, Movie2 is registered as image data that is to be played back next, and Movie3 is registered as image data that is to be played back last.

Image data can be registered in a playlist using the touch panel, more specifically, by selecting a thumbnail image of image data from an image-data list and then pressing an "ADD" button. Image data registered in a playlist can be deleted by selecting the image data registered in the playlist and then pressing a "DELETE" button. The order of image data registered in a playlist can be changed using up and down arrow buttons. A playlist can be saved as a file using a "SAVE" button.

A user is allowed to issue commands for these operations via the operating unit 109. In the first embodiment, the commands can be issued using the touch panel and a mode switching button on the operating unit 109. Alternatively, the commands may be issued using a mouse or the like.

A playlist can be generated by the operations described above. Although editing of a playlist that allows only setting of the order of playing back image data has been described above, other playlists allow setting of a start point and end point of playback, various effects, etc.

Now, specific operations will be described.

When the playlist editing mode is selected and a command for generating a new playlist is issued using the operation unit 109, the controller 106 issues a command to the recording/playback unit 101 so that thumbnails and metadata of each image file recorded on the recording medium M will be played back, and issues a command for switching to the playlist editing mode to the playlist manager 105.

The metadata obtaining unit 104 obtains the thumbnail image data and filename of each image file played back, and outputs these items to the display controller 107. The metadata obtaining unit 104 also outputs metadata including filenames and date information to the playlist manager 105 and the controller 106.

If a thumbnail image of certain image data is not provided, a thumbnail image of that image data may be generated by reducing the image data, as is generally known.

The controller 106, upon obtaining the thumbnail image data of all the image data recorded on the recording medium M, controls the playlist-editing display section 107b to generate a playlist editing screen showing the thumbnail images of the files in the area designated "IMAGE DATA LIST", as shown in FIG. 10. Referring to FIG. 10, thumbnails of six pieces of image data, Movie0 to Movie5, are displayed.

After the playlist editing screen is displayed as described above, the user generates a playlist using the touch panel on the operating unit 109.

When the user presses a position of the touch panel, the operating unit 109 sends position information indicating the position pressed to the controller 106. The controller 106 forwards the position information to the playlist manager 105.

The playlist manager 105, upon receiving the position information, determines the meaning of the position information. If the position pressed falls within the area designated "IMAGE DATA LIST," and if a thumbnail is displayed at the position, the playlist manager 105 holds the filename of the image data associated with the thumbnail. Furthermore, in order to put the thumbnail in selected status, the playlist manager 105 sends the filename of the image data and a thumbnail selecting command to the playlist-editing display section 107b via the controller 106.

The playlist-editing display section 107b, upon receiving the filename of the image data and the thumbnail selecting command, displays the thumbnail associated with the file such that the thumbnail will be recognized as selected. The selected status is indicated in a commonly employed manner, such as displaying the thumbnail as enclosed by a line in a particular color.

The playlist manager 105 holds and manages playlist data being edited in a memory, as well as the filename of the image data associated with the thumbnail image selected. The playlist data being edited includes a list of filenames of image data registered.

If the position pressed using the operating unit 109 falls within the area designated as the "ADD" button, the playlist manager 105 adds the filename of the image data associated with the thumbnail currently selected to the playlist data being edited. Then, the playlist manager 105 issues a command to the playlist-editing display section 107b via the controller 106 so that the thumbnail image of the added file will be added at a specified position.

The playlist-editing display section 107b displays, in the "PLAYLIST" area shown in FIG. 10, the thumbnail image of the file to be added.

Figure 2:
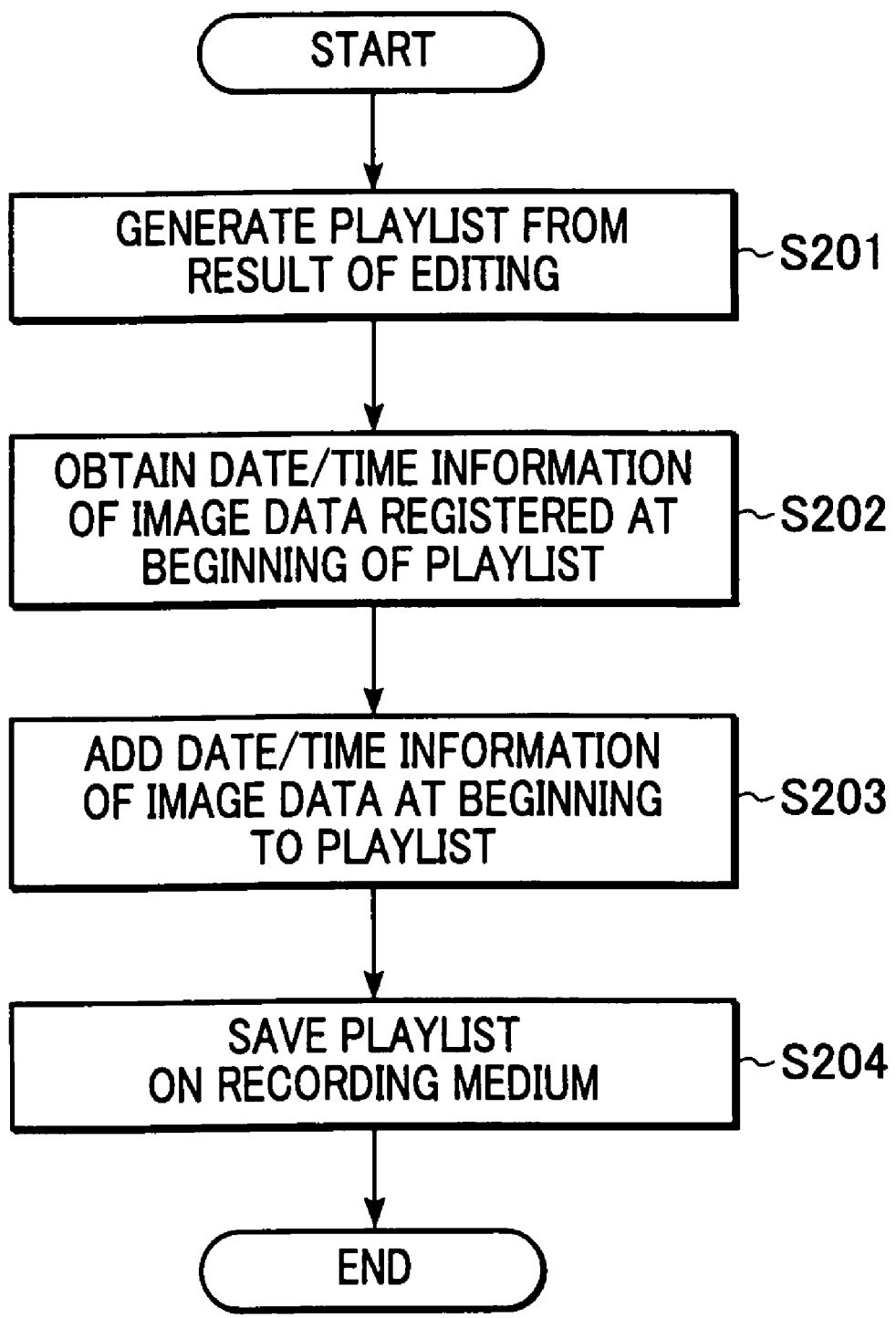
FIG. 2 is a flowchart showing a playlist saving process according to a first embodiment.

If the position pressed on the touch panel falls within the area designated as the "SAVE" button, the playlist manager 105 sends the playlist data being edited to the recording/playback unit 101 to start saving the playlist data on the recording medium M. The playlist saving process will be described with reference to a flowchart shown in FIG. 2.

When the "SAVE" button is pressed, in step S201, the playlist manager 105 generates playlist data based on a result of editing of the playlist. Then, in step S202, the playlist manager 105 detects date information of image data that is to be played back first according to the playlist from the date information of the image files transferred from the metadata obtaining unit 104. In step S203, the playlist manager 105 adds the date information to the playlist data, and also adds filename information, etc., thereby generating a playlist file. Then, the playlist manager 105 issues a command for saving the playlist to the controller 106. In step S204, the controller 106 issues a command to the recording/playback unit 101 so that the playlist file from the playlist manager 105 will be recorded on the recording medium M.

When playlist data that has already been recorded on the recording medium M is to be edited using the operating unit 109, the controller 106 controls the recording/playback unit 101 so that the playlist data recorded on the recording medium M will be played back. The playlist detector 103 detects the playlist data played back, and outputs the playlist data to the playlist manager 105. The playlist manager 105 analyzes the playlist data.

The controller 106 controls the recording/playback unit 101 so that metadata of each image file, such as thumbnail image data, filename, and date information, will be played back. The metadata obtaining unit 104 obtains these data items and outputs them to the playlist-editing display section 107b and the playlist manager 105.

The playlist manager 105 analyzes the playlist data played back, and issues a command to the playlist-editing display section 107b via the controller 106 so that an editing screen shown in FIG. 11 will be generated and displayed based on a playback procedure specified in the playlist.

The playlist-editing display section 107b displays the thumbnail images and filenames of the image data registered in the playlist data, as shown in FIG. 11. Then, the playlist is edited using the "ADD" button and the "SAVE" button as described above.

In this embodiment, it is presumed that a playlist file includes date information of the file itself. If a playlist file does not include date information of the file itself, however, a generation date of the file may be added to the playlist file as date information of the file itself.

The operation in the playlist editing mode has been described above. Although editing of a playlist that allows only setting of the playback order of image data has been described, alternatively, the present invention can be applied to playlists that allow setting of a playback start point and playback end point of moving-picture data, various effects, such as mosaic display, and other playback procedures.

Next, an operation in the content-list display mode will be described.

When the content-list display mode is specified by the user using the operating unit 109, the controller 106 controls the recording/playback unit 101 so that all the filenames and date information recorded on the recording medium M will be played back. The metadata obtaining unit 104 outputs the filename data and date information to the display controller 107 and the controller 106.

The controller 106, upon obtaining the date information of all the files, sorts the files in the order of date (e.g., date-sequential order from oldest to newest date). Then, the controller 106 controls the content-list display section 107a so that a screen display showing a list of filenames and date information in the sorted order will be generated and displayed on the monitor 108.

FIG. 3 shows an example of a display in which a content list is displayed. In this example, filenames and date information are displayed as items of the list. Obviously, thumbnail images may be additionally displayed. Referring to FIG. 3, a playlist file named PlayList1.pl is displayed. This playlist file is generated by saving the playlist shown in FIG. 10. That is, in the playlist file, Movie0, Movie2, and Movie3 are registered so that these items will be played back in the order shown in FIG. 10.

As shown in FIG. 3, the filename PlayList1.pl is displayed at a position of Dec. 15, 1999, along with the filename Movie0.mpg of image data registered in the playlist, which is easy to understand for the user.

According to the scheme described above, in a playlist file, date information regarding image data registered in the playlist is automatically recorded. Thus, when a list of content sorted based on date information is displayed, it becomes easier to grasp content, serving to improve ease of searching.

This embodiment can be applied to a camera-equipped recorder used with a recording medium that allows random access, video editing software for a personal computer, and the like.

Although the scheme in this embodiment is such that date information of a playlist file is generated based on date information of image data that is to be played back first among image data registered in a playlist, date information may be selected according to other criteria. For example, date information of image data that is to be played back last among image data registered in a playlist, date information of oldest image data among image data registered in a playlist, or date information of newest image data among image data registered in a playlist may be used. Furthermore, the scheme may be such that a user is allowed to select a criterion from among the criteria described above so that date information of the playlist will be generated according to the criterion selected by the user. Furthermore, selection of a generation date of playlist and setting of an arbitrary date may be additionally allowed as a basis of date information.

Second Embodiment

In the first embodiment described above, a playlist file is generated by adding date information to playlist data. In a second embodiment, in addition to date information, thumbnail image data of image files specified in playlist data is additionally recorded as thumbnail image data of the playlist data. The configuration of an image processing apparatus in the second embodiment is the same as that shown in FIG. 1, but processing that is executed for saving playlist data differs from that in the first embodiment.

Figure 4:
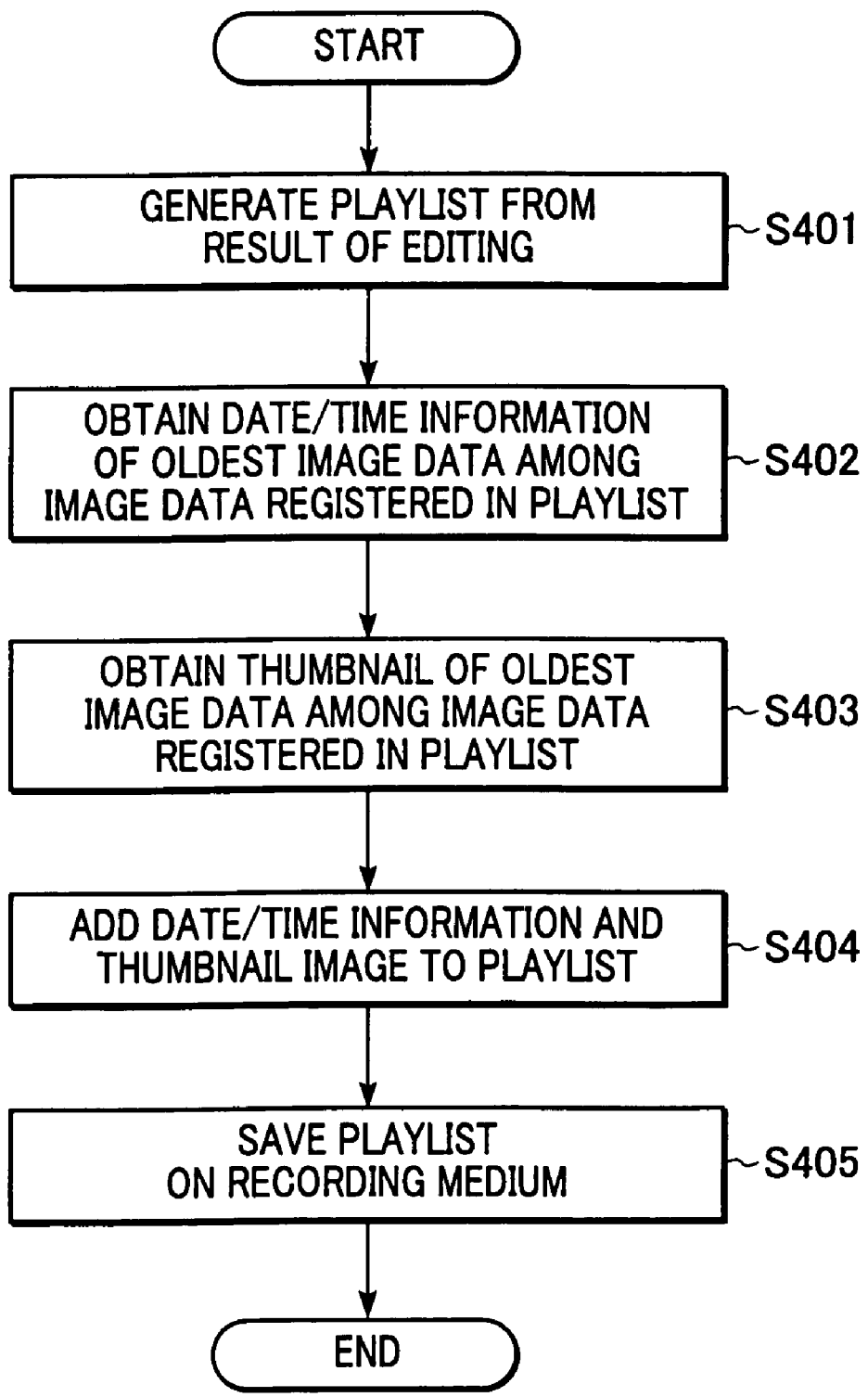
FIG. 4 is a flowchart showing a playlist saving process according to a second embodiment.

If a position pressed on the touch panel falls within the area designated as the "SAVE" button in the editing screen shown in FIG. 10, the playlist manager 105 starts processing for saving playlist data being edited on the recording medium M. The playlist saving process will be described with reference to a flowchart shown in FIG. 4.

When the "SAVE" button is pressed, in step S401, the playlist manager 105 generates playlist data based on a result of editing of the playlist. Then, in step S402, the playlist manager 105 detects date information of image data that is to be played back first according to the playlist from the date information of the image files transferred from the metadata obtaining unit 104. Then, in step S403, the playlist manager 105 obtains, from the metadata obtaining unit 104, thumbnail image data of the image data that is to be played back first according to the playlist. Then, in step S404, the playlist manager 105 generates a playlist file by adding the date information, thumbnail image data, filename information, etc. to the playlist data, and issues a command for saving the playlist to the controller 106. In step S405, the controller 106 issues a command to the recording/playback unit 101 so that the playlist file from the playlist manager 105 will be recorded on the recording medium M.

Next, an operation in the content-list display mode will be described. The operation in the content-list display mode is the same as that in the first embodiment except in that thumbnail images are displayed as an item in the list.

When the content-list display mode is specified by the user using the operating unit 109, the controller 106 controls the recording/playback unit 101 so that all the filenames, date information, and thumbnail image data recorded on the recording medium M will be played back. The metadata obtaining unit 104 outputs the filename data and date information to the display controller 107 and the controller 106, and also outputs the thumbnail image data to the display controller 107.

The controller 106, upon obtaining the date information of all the files, sorts the files in the order of date (e.g., date-sequential order beginning with the oldest date). Then, the controller 106 controls the content-list display section 107a so that a screen showing a list of filenames, date information, and thumbnail images arranged in the sorted order will be generated and displayed on the monitor 108.

FIG. 5 shows an example of a display in which a content list is displayed. In this example, items in the list include filenames, date information, and thumbnail images. Obviously, other information may be displayed.

Referring to FIG. 5, a playlist file named PlayList1.pl is displayed. This playlist file is obtained by saving the playlist shown in FIG. 10. That is, in the playlist file, Movie0, Movie2, and Movie3 are registered so that these items will be played back in the order shown in FIG. 10.

As shown in FIG. 5, the filename PlayList1.pl is displayed at a position of Dec. 15, 1999, along with the filename Movie0.mpg of the oldest image data among the image data registered in the playlist. Furthermore, the thumbnail images of the playlist file are related to date information of the playlist, which facilitates understanding by the user.

By the scheme described above, in a playlist file, date information and thumbnail image data regarding image data registered in the playlist are automatically recorded. Thus, when a list of content sorted in order based on date information is displayed, it becomes easier to grasp content, serving to improve ease of searching.

Third Embodiment

Next, a third embodiment will be described. In the third embodiment, the configuration of an image processing apparatus is the same as that shown in FIG. 1.

In the third embodiment, in addition to date information and thumbnail images, position information is recorded as metadata of a playlist file. Furthermore, in this embodiment, a content list can be displayed using a map.

Thus, in this embodiment, when a playlist is saved, date information, thumbnail image, and position information of the playlist are generated based on date information, thumbnail image, and position information of image data with date information indicating an oldest date among image data registered in the playlist.

First, an operation in the playlist editing mode will be described. The operation in the playlist editing mode is the same as that in the second embodiment, except for the processing for saving a playlist, so that only the playlist saving process will be described herein.

Figure 6:
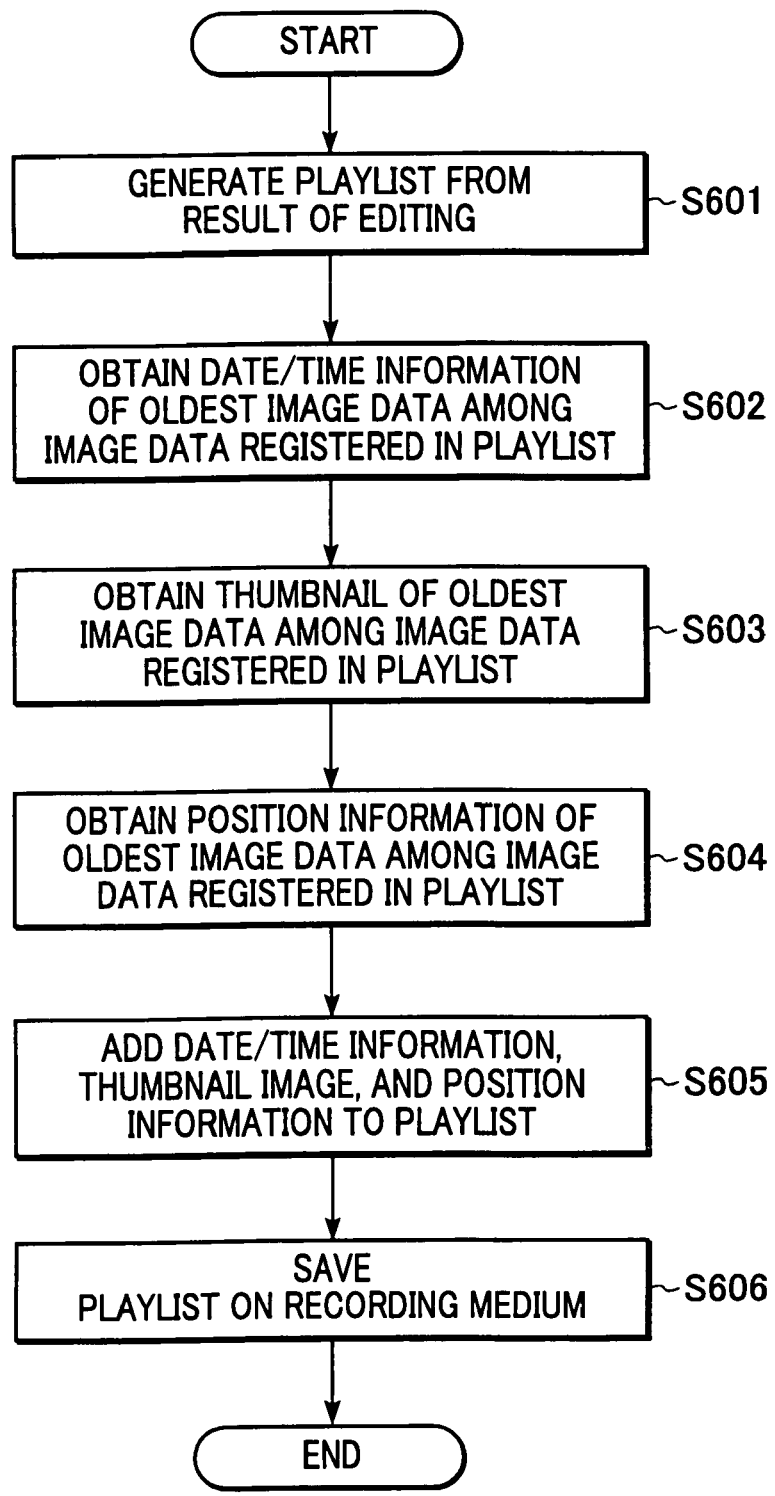
FIG. 6 is a flowchart showing a playlist saving process according to a third embodiment.

If the position pressed on the touch panel in the editing screen shown in FIG. 10 falls within the area designated as the "SAVE" button, the playlist manager 105 starts a process for saving playlist data being edited on the recording medium M. The playlist saving process will be described with reference to a flowchart shown in FIG. 6.

When the "SAVE" button is pressed, in step S601, the playlist manager 105 generates playlist data based on a result of editing of the playlist. Then, in step S602, the playlist manager 105 detects date information of image data that is to be played back first according to the playlist from the date information of the image files transferred from the metadata obtaining unit 104. Then, in step S603, the playlist manager 105 obtains, from the metadata obtaining unit 104, thumbnail image data of the image data that is to be played back first according to the playlist. Then, in step S604, the playlist manager 105 obtains, from the metadata obtaining unit 104, position information of the image data that is to be played back first according to the playlist. Then, in step S605, the playlist manager 105 generates a playlist file by adding the date information, thumbnail data, position information, filename information, and the like, to the playlist data. Then, the playlist manager 105 issues a command for saving the playlist to the controller 106. In step S606, the controller 106 issues a command to the recording/playback unit 101 so that the playlist file from the playlist manager 105 will be recorded on the recording medium M.

Next, operation in the content-list display mode will be described.

When the content-list display mode is specified by the user using the operating unit 109, the controller 106 controls the recording/playback unit 101 so that all the filenames, date information, thumbnail image data, and position information recorded on the recording medium M will be played back. The metadata obtaining unit 104 outputs the filename data and date information to the display controller 107 and the controller 106, and also outputs the thumbnail image data and position information to the display controller 107.

The controller 106, upon obtaining the date information of all the files, sorts the files in the order of date (e.g., date-sequential order beginning with the oldest date). The controller 106 controls the content-list display section 107a so that a screen based on filenames and date information in the sorted order and map information stored in an internal ROM will be generated and displayed on the monitor 108.

Figure 7:
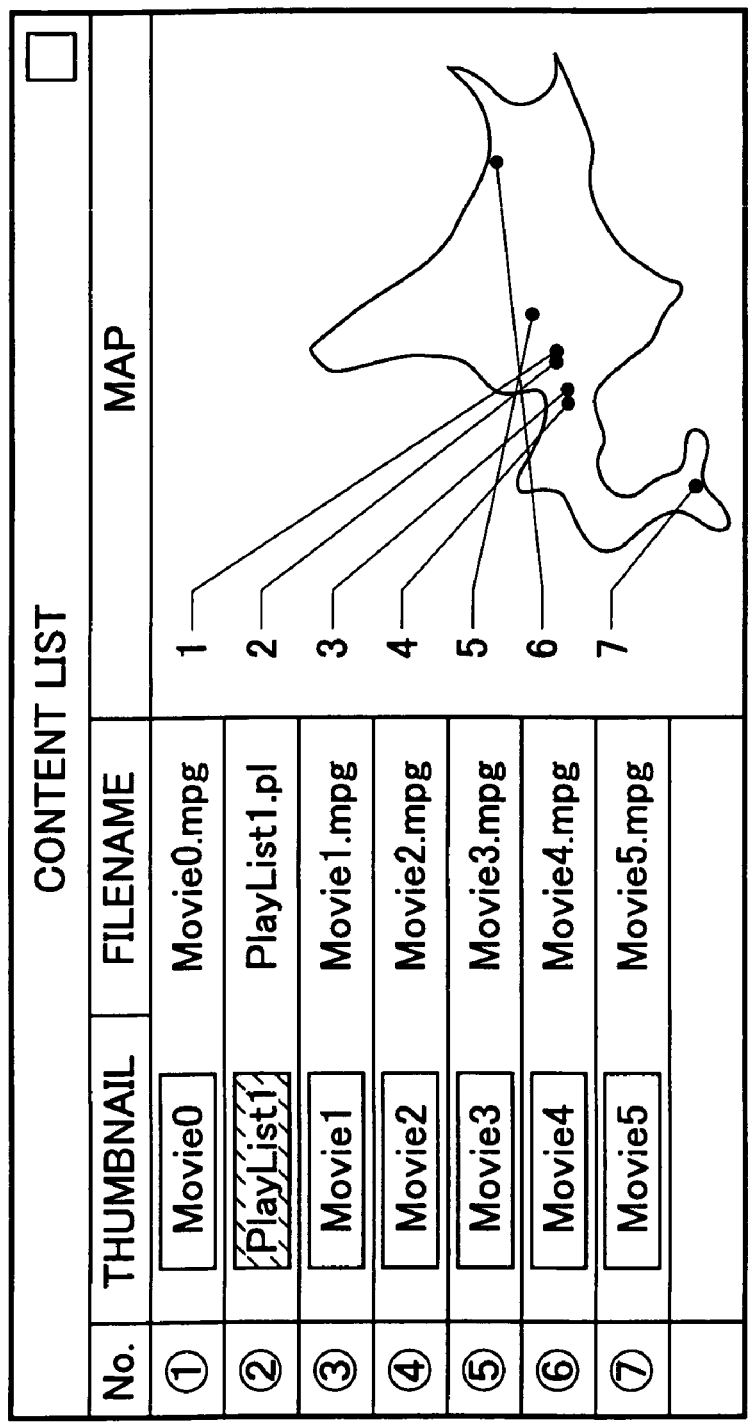
FIG. 7 shows a content-list display screen according to the third embodiment.
Figure 9:
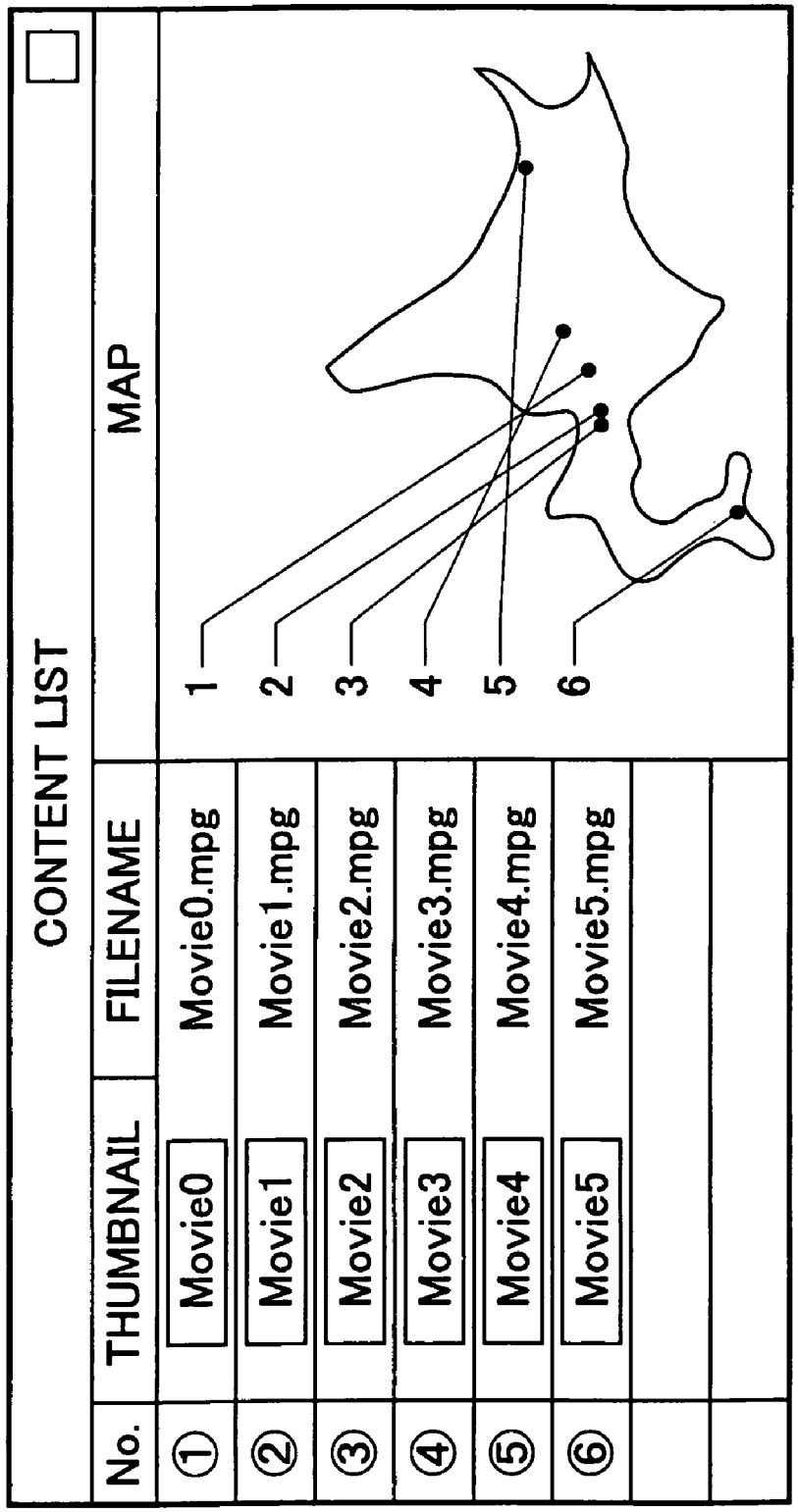
FIG. 9 is a conventional content-list display screen that is based on position information.
Figure 12:
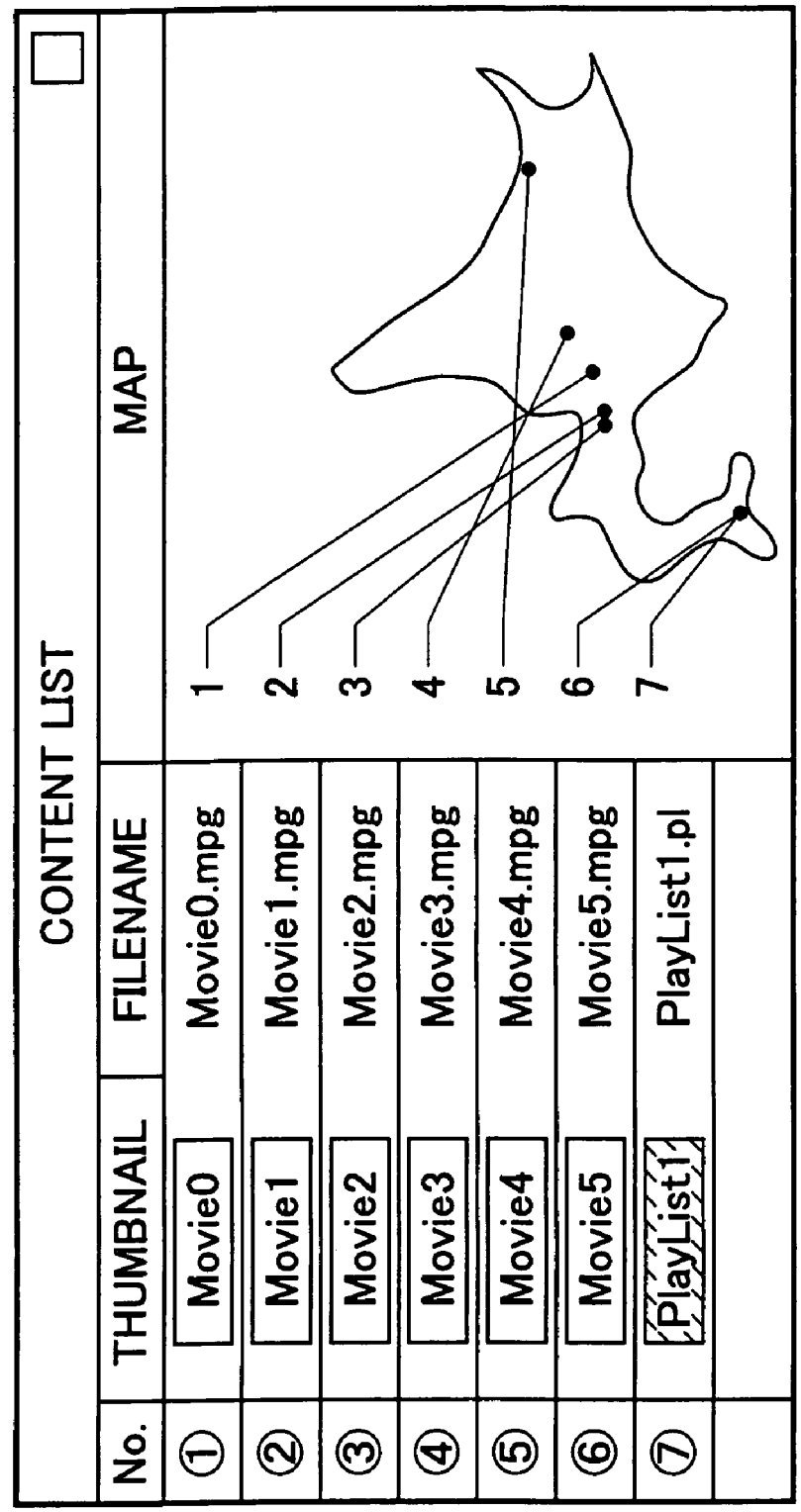
FIG. 12 shows a conventional content-list display screen showing a result of editing a playlist.

FIG. 7 shows an example of a display in which a content list is displayed. In this example, filenames, thumbnails, and position information are displayed as items in the list. Obviously, other information may be displayed.

Referring to FIG. 7, a playlist file named PlayList1.pl is displayed. This playlist file is obtained by saving the playlist shown in FIG. 10. That is, in the playlist file, Movie0, Movie2, and Movie3 are registered so that these items will be played back in the order shown in FIG. 10.

As shown in FIG. 7, the filename PlayList1.pl is displayed along with the filename Movie0.mpg of the oldest image data among the image data registered in the playlist. Furthermore, since the position information of the playlist file is the position information of the file Movie0.mpg, which relates to the content of the playlist, the position information is easy to understand for the user.

According to the scheme described above, in a playlist file, date information, thumbnail image data, and position information regarding image data registered in the playlist area automatically are recorded. Thus, when image data is displayed over a map based on position information, it becomes easier to grasp content, serving to improve ease of searching.

The objects of the present invention can also be achieved by providing a system or apparatus with a storage medium (or recording medium) having recorded thereon program code of software for implementing the functions of the embodiments described above, so that a computer (or a CPU or MPU) of the system or apparatus is allowed to read and execute the program code stored in the storage medium.

In that case, the functions of the embodiments described above are implemented by the program code read from the storage medium, so that the storage medium storing the program code constitutes the present invention. Furthermore, instead of achieving the functions of the embodiments described above by a computer reading and executing the program code, the functions of the embodiments described above may be achieved by executing a part or the entirety of actual processing based on instructions of the program code by an operating system (OS) or the like running on the computer, which is also within the scope of the present invention.

Furthermore, the program code read from the storage medium may be written to a memory of a functional extension card inserted into the computer or a functional extension unit connected to the computer so that the functions of the embodiments described above will be achieved by executing a part or the entire processing based on instructions of the program code by a CPU or the like of the functional extension card or functional extension unit, which is also within the scope of the present invention. When the present invention is implemented in the form of the storage medium, the storage medium stores the program code corresponding to the flowcharts described above.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An apparatus for processing image data, the apparatus comprising:
   specifying means for specifying a playback order of a plurality of pieces of image data;
   detecting means for detecting date information of the plurality of pieces of image data specified in the playback order specified by said specifying means;
   playlist processing means for generating playlist data indicating the playback order specified by said specifying means;
   date generating means for generating date information of the playlist data, for use in sorting the playlist data, by using date information of one of the plurality of pieces of image data detected by said detecting means; and
   recording means for recording the playlist data and the date information of the playlist data in association with each other on a recording medium, the date information of the playlist data being recorded separately from the plurality of pieces of image data's date information.

2. An apparatus according to claim 1, wherein the recording means generates a playlist file including the playlist data and the date information of the playlist data, and records the playlist file on the recording medium.

3. An apparatus according to claim 1, further comprising means for storing a generation date of the playlist data.

4. An apparatus according to claim 1, wherein said date generating means generates the date information of the playlist data by using date information of image data that is to be played back first among the plurality of pieces of image data specified in the playlist data.

5. An apparatus according to claim 1, wherein said date generating means generates the date information of the playlist data by using date information of image data that is to be played back last among the plurality of pieces of image data specified in the playlist data.

6. An apparatus according to claim 1, wherein said date generating means generates the date information of the playlist data by using date information of image data having date information indicating an oldest date among the plurality of pieces of image data specified in the playlist data.

7. An apparatus according to claim 1, wherein said date generating means generates the date information of the playlist data by using date information of image data having date information indicating a latest date among the plurality of pieces of image data specified in the playlist data.

8. An apparatus according to claim 1, wherein the playlist processing means further generates thumbnail image data of the playlist data by using one of the plurality of pieces of the image data specified in the playlist data, and the recording means further records the thumbnail image data of the playlist data in association with the playlist data on the recording medium.

9. An apparatus according to claim 8, wherein said date generating means generates the date information of the playlist data by using the date information of the one image data selected from the plurality of pieces of image data specified in the playlist data, and the playlist processing means generates thumbnail image data of the playlist data based on the image data selected.

10. An apparatus according to claim 1, further comprising:
    playback means for playing back the plurality of pieces of image data, the playlist data, and the date information of the playlist data from the recording medium; and
    display control means for sorting the plurality of pieces of image data and the playlist data in accordance with the date information of the plurality of pieces of image data and the date information of the playlist data and for displaying information regarding the plurality of pieces of image data and information regarding the playlist data recorded on the recording medium, in an order of the sorted result by the date information.

11. An apparatus according to claim 1, wherein the recording medium is a recording medium that allows random access.

12. A signal processing method for processing image data, the method comprising the steps of:
    specifying a playback order of a plurality of pieces of image data;
    detecting date information of the plurality of pieces of image data specified in the playback order specified by said specifying step;
    generating playlist data indicating the playback procedure specified by said specifying step;
    generating date information of the playlist data, for use in sorting the playlist data, by using date information of one of the plurality of pieces of image data information detected by said detecting step; and
    recording the playlist data and the date information of the playlist data in association with each other on a recording medium, the date information of the playlist data being recorded separately from the plurality of pieces of image data's date information.

13. An apparatus for processing image data and playlist data indicating a playback order of a plurality of pieces of image data, the apparatus comprising:
    detecting means for detecting date information of the plurality of pieces of image data specified in the playback order indicated by the playlist data;
    playlist processing means for generating date information of the playlist data, for use in sorting the playlist data, by using date information of one of the plurality of pieces of image data detected by said detecting means; and
    recording means for recording the playlist data and the date information of the playlist data in association with each other on a recording medium, the date information of the playlist data being recorded separately from the plurality of pieces of image data's date information.

14. An apparatus according to claim 13, further comprising:
    playback means for playing back the plurality of pieces of image data, the playlist data, and the date information of the playlist data from the recording medium; and
    display control means for sorting the plurality of pieces of image data and the playlist data in accordance with the date information of the plurality of pieces of image data and the date information of the playlist data and for displaying information regarding the plurality of pieces of image data and information regarding the playlist data in the sorted order.

* * * * *